United States Patent
Harper et al.

(10) Patent No.: US 11,977,909 B2
(45) Date of Patent: May 7, 2024

(54) HARDWARE PLACEMENT AND MAINTENANCE SCHEDULING IN HIGH AVAILABILITY SYSTEMS

(71) Applicant: International Business Machines Corporation, Armonk, NY (US)

(72) Inventors: Richard E. Harper, Chapel Hill, NC (US); Harigovind V. Ramasamy, Round Rock, TX (US); Valentina Salapura, Chappaqua, NY (US); Sandhya Kapoor, Austin, TX (US); Long Wang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 17/490,247

(22) Filed: Sep. 30, 2021

(65) Prior Publication Data
US 2022/0019457 A1 Jan. 20, 2022

Related U.S. Application Data

(62) Division of application No. 16/254,991, filed on Jan. 23, 2019, now Pat. No. 11,169,836.

(51) Int. Cl.
*G06F 9/455* (2018.01)
*G06F 9/50* (2006.01)

(52) U.S. Cl.
CPC .......... *G06F 9/45558* (2013.01); *G06F 9/505* (2013.01); *G06F 9/5072* (2013.01); *G06F 9/5083* (2013.01); *G06F 2009/4557* (2013.01); *G06F 2009/45595* (2013.01)

(58) Field of Classification Search
CPC .... G06F 9/45558; G06F 9/505; G06F 9/5072; G06F 9/5083; G06F 2009/4557; G06F 2009/45595; G06F 8/65; G06F 9/5077
See application file for complete search history.

(56) References Cited

U.S. PATENT DOCUMENTS

| 8,250,213 | B2 | 8/2012 | Glover | |
|---|---|---|---|---|
| 10,171,336 | B2 | 1/2019 | Kern | |
| 2009/0164832 | A1* | 6/2009 | Kanso | G06F 11/1482 714/1 |
| 2010/0005465 | A1* | 1/2010 | Kawato | G06F 9/5088 718/1 |
| 2011/0035738 | A1* | 2/2011 | Toeroe | G06F 8/65 717/168 |

(Continued)

OTHER PUBLICATIONS

Peter Mell, "The NIST Definition of Cloud Computing," Special Publication 800-145; pp. 1-7, Sep. 2011.

(Continued)

*Primary Examiner* — Jorge A Chu Joy-Davila
(74) *Attorney, Agent, or Firm* — James Olsen; Otterstedt & Kammer PLLC (57) ABSTRACT

A method of organizing computer resources includes receiving a specification defining a plurality of quiescence groups of independent component instances for each of at least two services, and performing a first load balancing of the quiescence groups across a plurality of physical servers to define a plurality of supergroups while assigning each of the physical servers across the supergroups.

6 Claims, 8 Drawing Sheets

(56) References Cited

U.S. PATENT DOCUMENTS

| | | | |
|---|---|---|---|
| 2014/0019961 A1* | 1/2014 | Neuse | G06F 9/5077 |
| | | | 718/1 |
| 2014/0157261 A1* | 6/2014 | Toeroe | G06F 9/45533 |
| | | | 718/1 |
| 2014/0325036 A1 | 10/2014 | Jahanbanifar et al. | |
| 2016/0306642 A1 | 10/2016 | Kottomtharayil et al. | |
| 2017/0026235 A1 | 1/2017 | Famaey | |
| 2017/0279874 A1 | 9/2017 | Jolfaei | |
| 2018/0150780 A1 | 5/2018 | Gibbs et al. | |
| 2018/0225119 A1 | 8/2018 | Alexander | |
| 2019/0268407 A1 | 8/2019 | Zeng | |
| 2020/0028640 A1 | 1/2020 | Yeo | |
| 2021/0144056 A1* | 5/2021 | Chakrapani Rangarajan | |
| | | | H04L 41/5012 |

OTHER PUBLICATIONS

List of IBM Patents or Patent Applications Treated as Related pp. 1-2 Sep. 30, 2021.

* cited by examiner

HARDWARE PLACEMENT AND MAINTENANCE SCHEDULING IN HIGH AVAILABILITY SYSTEMS

CROSS-REFERENCE TO RELATED APPLICATION

This application is a divisional of U.S. patent application Ser. No. 16/254,991, filed Jan. 23, 2019, the complete disclosure of which is expressly incorporated herein by reference in its entirety for all purposes.

BACKGROUND

The present disclosure relates generally to the maintenance of a computer system, and more particularly to methods for organizing and maintaining resources of the computer system.

Conventional virtual machine (VM) high availability (HA) systems pool VMs and the physical servers they reside on into one or more clusters. The physical servers, or hosts, in the cluster are monitored, and in the event of a host failure the VMs on a failed host are restarted on alternate hosts.

Two or more VMs providing a given service in the HA system are typically anti-collocated on different physical servers to ensure fault containment relative to physical server failures, wherein a service provided by the VMs is live or available if at least one VM is running.

A single HA system can support multiple services at same time. Moreover, the HA system may support multiple tenancy, users, roles, etc. Each service typically includes of a number of components, such as a webserver, database, etc. The HA system supports multiple instances of each component. These components (with at least one instance of each component) should be live or available so that the service they provide is live or available.

In conventional HA systems, in a case where components need maintenance (e.g., upgrade, patching, etc.), several instances of the components are taken down, while other instances remain live, without affecting a current availability of the service, the taken-down instances are maintained (e.g., upgraded, patched), and the instances are brought up. This take-down/bring-up process can be repeated with other instances of the components.

SUMMARY

According to some embodiments of the present invention, a method of organizing computer resources includes receiving a specification defining a plurality of quiescence groups of independent component instances for each of at least two services, and performing a first load balancing of the quiescence groups across a plurality of physical servers to define a plurality of supergroups while assigning each of the physical servers across the supergroups. In some embodiments of the present invention, the method includes performing a maintenance function on portions of the computer system supporting sequential ones of the supergroups without interrupting the services, wherein performing the maintenance function includes taking down, simultaneously, the independent component instances of the quiescence groups within a given supergroup.

According to some embodiments of the present invention, in a method of maintaining resources of a computer system, the computer system being organized into a plurality of supergroups, each of the supergroups including at least one quiescence group of independent component instances executing on different physical servers, the method includes determining a minimum achievable number of supergroups needed to perform a service of the computer system, sorting the quiescence groups in a plurality of services by resource consumption, sorting the supergroups by resource utilization, and selecting each of the quiescence groups sequentially beginning with a quiescence group having a heaviest resource consumption, and placing a currently selected quiescence group on a supergroup having a lowest resource utilization among the supergroups and into which the currently selected quiescence group fits, and within the supergroup having the lowest resource utilization placing the currently selected quiescence group on a physical service having a lowest resource utilization among the physical servers, and resorting the supergroups by resource utilization upon placing the currently selected quiescence group. In some embodiments, placing the currently selected quiescence group on the supergroup having the lowest resource utilization among the supergroups and into which the currently selected quiescence group fits further includes determining that the currently selected quiescence group does not fit in any of the supergroups, adding a physical server to one of the supergroups having a highest resource utilization, and placing the selected group on the physical server added to the supergroup having the highest resource utilization.

According to some embodiments of the present invention, in a method of maintaining resources of a computer system, the computer system being organized into a plurality of supergroups, each of the supergroups including at least one quiescence group of independent component instances executing on different physical servers, the method includes determining a minimum achievable number of supergroups needed to perform a service of the computer system, placing the quiescence groups into the supergroups, wherein at least one of the quiescence groups is placed in each of the supergroups and each of the quiescence groups comprises independent component instances of the service, assigning a plurality of physical servers to each of the supergroups, and load-balancing the independent component instances to the physical servers assigned to each of the supergroups, wherein the placement of the quiescence groups into the supergroups is performed without knowledge of the physical servers. In some embodiments, the method further includes adding a new physical server to a first supergroup of the supergroups upon determining that a resource of the first supergroup's physical servers is insufficient for the quiescence groups of the first supergroup.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:
  a. a combined approach to Quiescence Group placement and upgrade wave scheduling reducing a maintenance window; and
  b. reduction of the maintenance window duration improving hardware utilization and high availability protection.

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings.

DETAILED DESCRIPTION

Embodiments of the present invention related to the maintenance of virtual machine (VM) systems, without interrupting or breaking the services running on the system such that high availability (HA) is achieved. It should be understood that HA refers to a tolerance of a system to failures of a (typically predetermined) number of instances of a component. HA can be defined by compliance or regulatory requirements.

Some embodiments of the present invention improve (e.g., reduce) a total maintenance time (e.g., patch time, maintenance window, etc.) for the VM-HA system by taking down certain instances, without interrupting the service that the instances below to. Further, some embodiments of the present invention address a problem of maintaining (e.g., upgrading, patching) host (e.g., physical machine or VM) component instances (VMs or containers) on a same host (e.g., VMs on the same physical machine, or containers on the same VM), which can be constrained by dependencies of the instances on the physical machine (or VM if the instance is a container). It should be understood that embodiments of the present invention include heuristic combinations of these technological improvements.

Embodiments of the present invention are applicable to hosts including, for example, physical machines and availability zones.

Some embodiments of the present invention are directed to quiescence groups (QGs), which capture sets of component instances that can be taken down at the same time. According to one or more embodiments of the present invention, if two or more VMs (or containers) can be taken down at a same time without bringing down the service, then these VMs can be placed in a QG. Embodiments of the present invention include a formulation of the problem of QG placement. Some embodiments of the present invention include a method that leverages the input of the QGs to improve a total service time and/or hardware utilization.

According to an embodiment of the present invention, VMs, containers and instances that are taken down (quiesced, taken offline, etc.) stop executing on a processor. An instance that has been taken down is then available for maintenance, wherein for example, the code of the instance stored in persistent memory can be patched or upgraded.

According to one or more embodiments of the present invention, a plurality of QGs capture those VMs/containers that can be quiesced at a same time, while not affecting the any service's availability. According to an exemplary embodiment of the present invention, each QG is a partition of the entire VM/container (component instance) set. All component instances (resources) of the system are partitioned into the QGs. In some embodiments, the QGs are given or predefined by developers or administrators to reflect dependencies of the VMs/containers in all services. The QGs can be defined to support QoS (quality of service) goals, constraints, requirements, etc.

In a system comprising a plurality of physical servers and QGs, the placement of the QGs on the physical servers and the scheduling of the physical server maintenance affects the time needed for maintenance task(s). More particularly, the time needed for maintenance can be impacted by the placement and sequence of maintenance waves or supergroups. Maintenance waves are configured such that no service is broken by having more than one QG on a downed physical server in a given wave. Each maintenance wave corresponds to a round of take-downs of QGs. Moreover, the maintenance waves are configured such that a fewest number of waves is used for the maintenance task(s), which reduces (e.g., minimize) an overall maintenance time, while the workload of the QGs is balanced across the physical servers, for example, based on a generalized notion of resource utilization (e.g., processor cores, memory resources including disk and random access memories, etc.).

Embodiments of the present invention are directed to methods for aggregating service QGs into quiescence supergroups (QSG) (also referred to a waves) and assigning the QSG in a load balanced manner to availability zones (AZ), such that any single QSG can fail or be maintained without impacting the availability of any service provided by the system.

Figure 1:
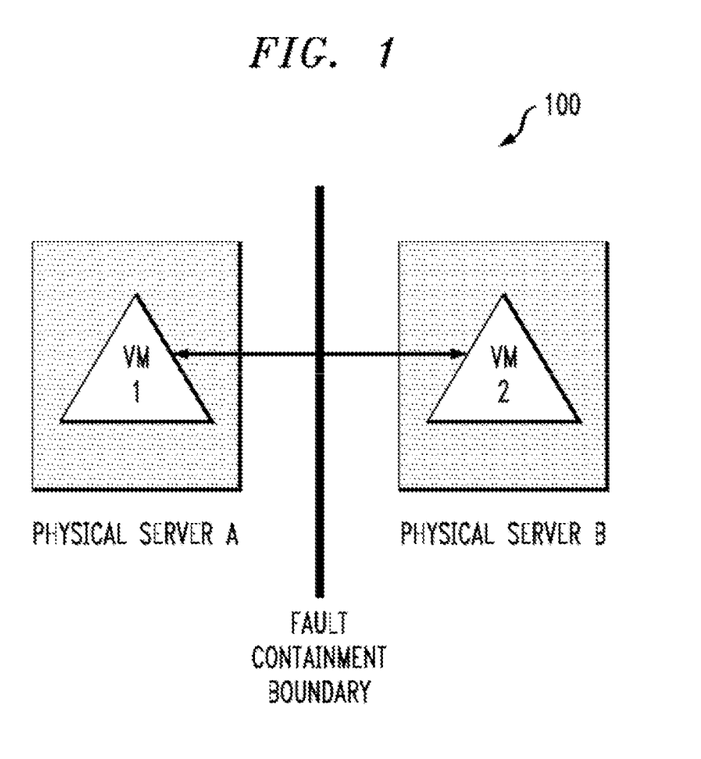
FIG. 1 is a diagram of a high availability cluster according to an exemplary embodiment of the present invention.

FIG. 1 illustrates a HA cluster 100 comprising two VMs, VM1 and VM2, placed on physical servers A and B, such that failure of either physical server will not cause the HA cluster 100 to fail.

Figure 2:
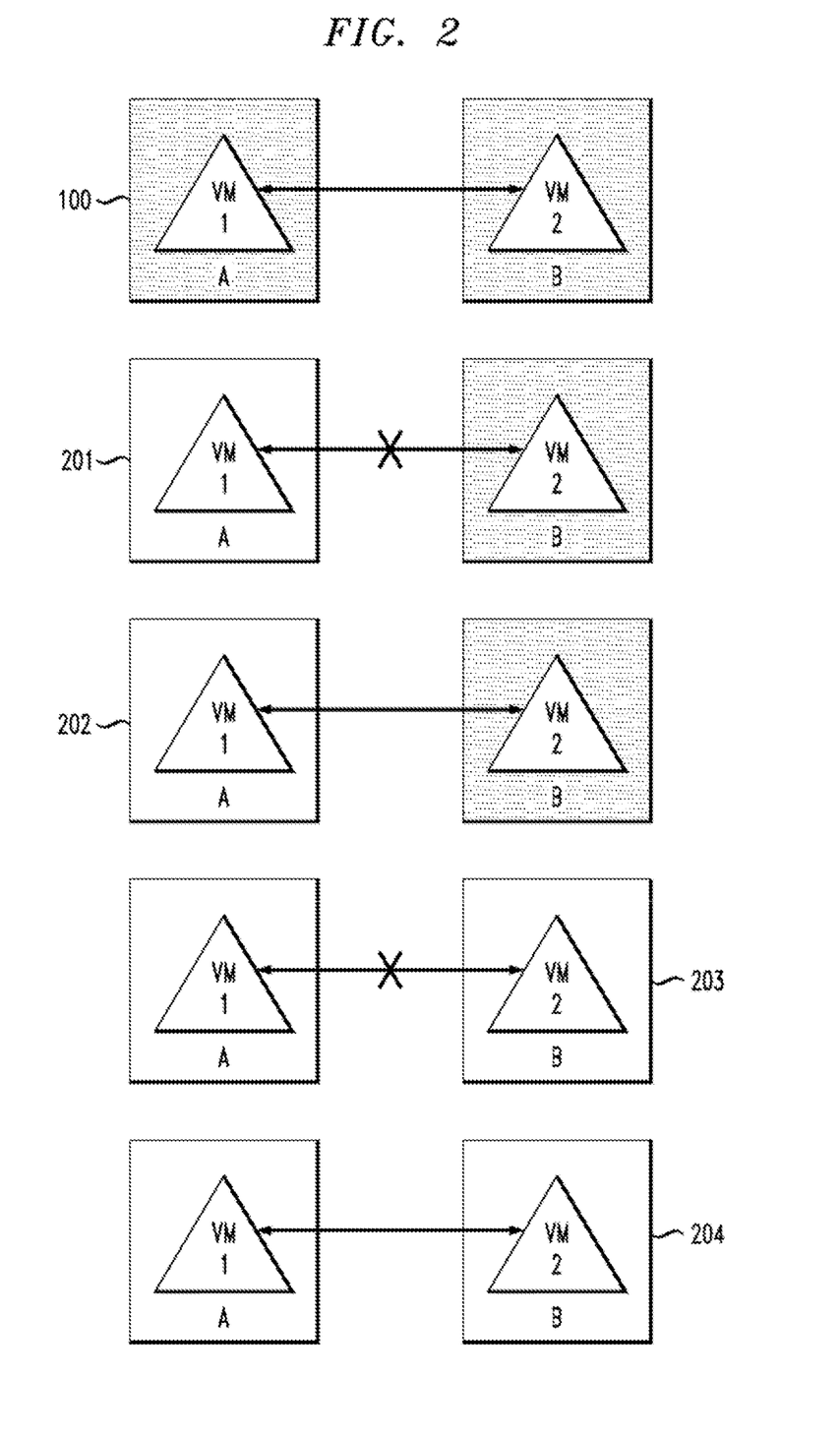
FIG. 2 is a diagram illustrating a method for rolling upgrades according to an exemplary embodiment of the present invention.

It is possible to maintain the underlying physical servers in an HA cluster without incurring an outage via rolling maintenance. For example, referring to FIG. 2 and in the case where a maintenance event includes a VM upgrade, given HA cluster 100, a physical server A is disconnected at 201 and upgraded, while VM2 on physical server B runs the workload. Physical server A is brought up and re-integrated into the HA cluster at 202. Physical server B is disconnected and upgraded at 203 while VM 1 on physical server A runs the workload. Physical server B is re-integrated into the HA cluster at 204. In this example, there is no guarantee of high availability during the upgrade. As used herein, maintenance can include repair, firmware upgrade, hardware upgrade, etc.

Figure 3:
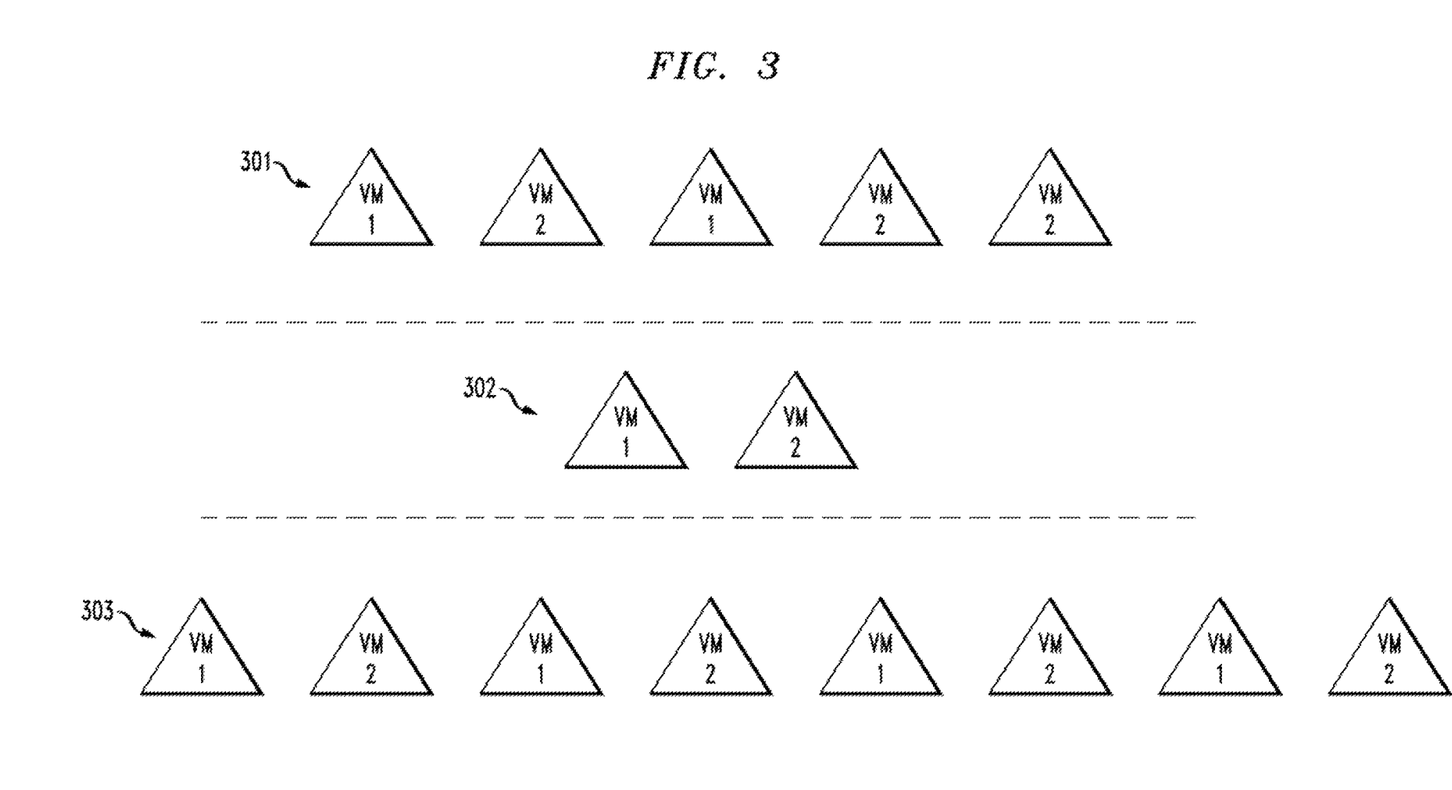
FIG. 3 shows a service topology according to an exemplary embodiment of the present invention.

FIG. 3 illustrates a service including fifteen VMs. The general configuration of the service shown in FIG. 3 exemplifies a deployment of a Hadoop distributed file system (hdfs). In this example, HA constrains require that at least 4/5 of the master nodes 301 must be up for the service to be operational, that ½ of the name nodes 302 must be up for the service to be operational, and that 7/8 of the data nodes 303 must be up for the service to be operational. It should be understood that other services may be different HA constraints.

Figure 4:
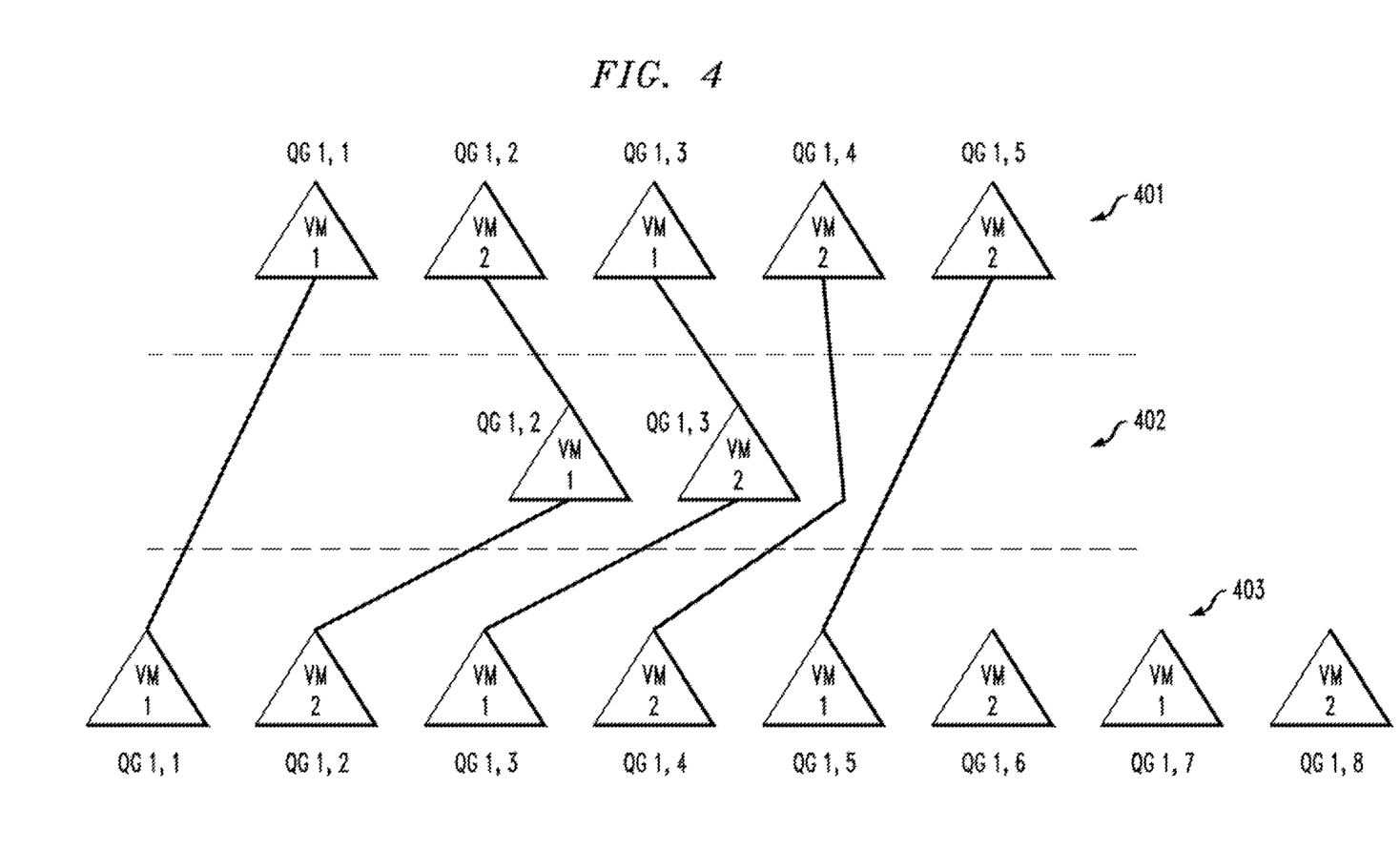
FIG. 4 shows a service quiescence group according to an exemplary embodiment of the present invention.

According to an exemplary embodiment of the present invention, FIG. 4 illustrates a service divided into QGs, denoted QG <serviceID>, <QGID> (where ID is an identifier). According to one or more embodiments, any single QG can be taken down without impairing the operation of the service such that high availability is maintained. In this example, "Hadoop File System" service 1 has eight QGs. The QGs are typically created by the service architects based on the HA structure of their service. It can be assumed for purposes of the present example that to maintain high availability at least 4/5 of the master nodes (e.g., VMs) at level 401 must be up for service to be operational, that at least ½ of the name nodes at level 402 must be up for service to be operational and that at least 7/8 of the data nodes at level 403 must be up for service to be operational. With each of the QGs placed on a different physical server, any single physical server containing a single QG can fail or be serviced without taking down the service.

Figure 5:
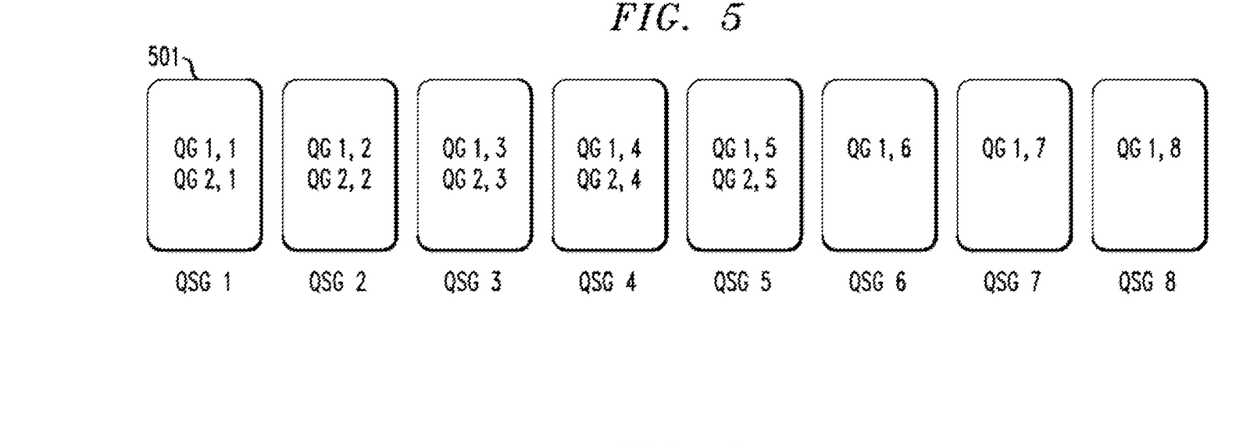
FIG. 5 shows a system comprising a plurality of quiescence supergroups according to an exemplary embodiment of the present invention.

Referring now to FIG. 5, according to some embodiments, a QSG is a combination of QGs from one or more services (e.g., QSGs 1-8 contain the QGs from services 1 and 2). As shown in FIG. 5, QSG1 501 includes QG1,1 and QGF2,1. In some embodiments, each QSG contains not more than one QG for any given service. For example, no QSG will contain both QG1,1 and QG1,4. According to an exemplary embodiment of the present invention, one QSG can fail or be taken down for maintenance without disrupting the operation of any service.

Figure 6:
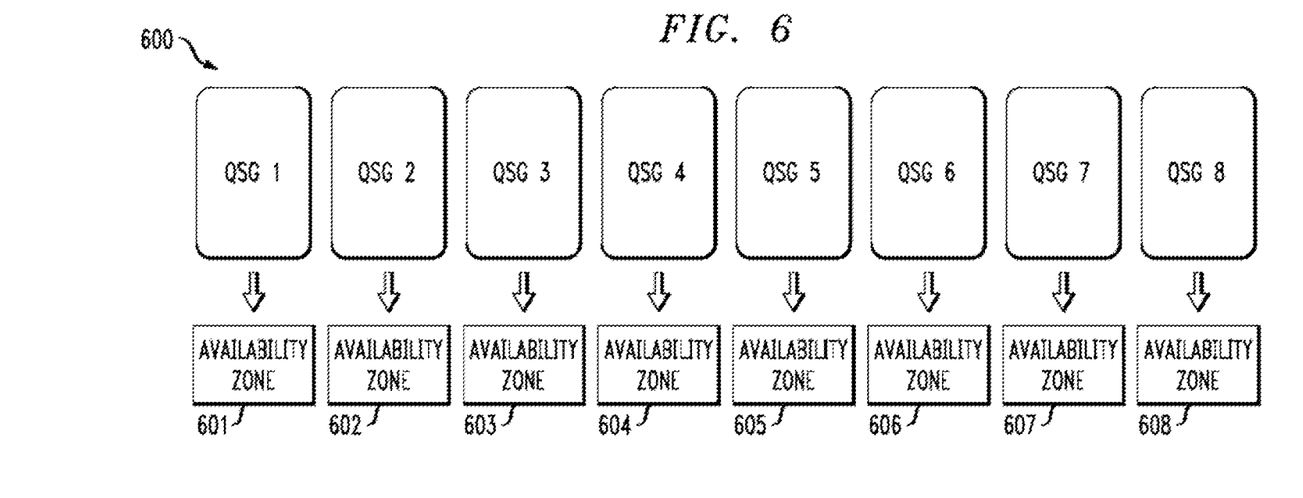
FIG. 6 shows a system comprising a plurality of quiescence supergroups according to an exemplary embodiment of the present invention.

As shown in FIG. 6, the QSGs 600, once created, can be placed on physical servers, or more generally, into AZs 601-608. Any single AZ 601-608 can be shut down without causing an outage of any service. In some embodiments, an AZ can include a disjoint collection of physical servers. According to some embodiments, any single AZ 601-608 can fail without causing an outage of any service.

Figure 7:
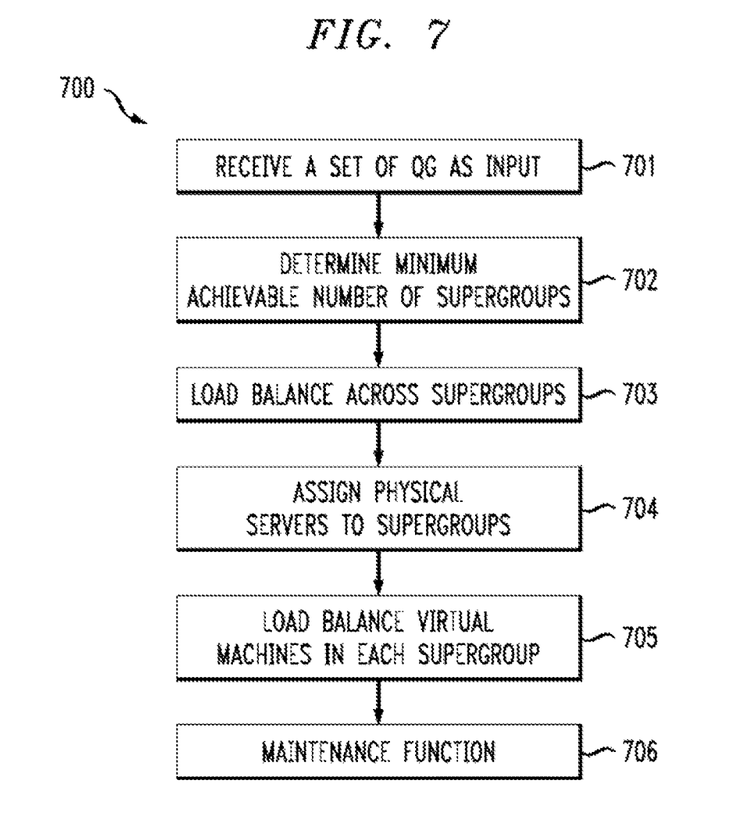
FIG. 7 is a diagram illustrating a method for quiescence supergroup placement according to an exemplary embodiment of the present invention.

Referring now to FIG. 7, according to one or more embodiments of the present invention, in a method of QSG placement 700, a set of QGs is received 702 (for example, defined by one or more service owners). A set of QGs within a service can be written as: QG(i, j), where i=service ID and j=QG ID within service i. The method includes determining a minimum achievable number of supergroups, wherein the minimum achievable number of supergroups, N, is the largest number of QGs contained by any service (e.g., N=max |QG(i,j)| for all i,j) 702. At block 703, the QGs are load balanced across the N supergroups subject to i!=m for all QG(m,*) in supergroup G, wherein m is the set of all services in G (and * is an empty set or placeholder). The load balancing at block 703 includes placing each QG in a supergroup such that each supergroup includes not more than one QG from the same service. At block 704, at least one physical server is assigned to a supergroup. The method further includes load balancing the VMs in each supergroup to the physical servers in the supergroup 705. At block 705 there is no need to perform an explicit anti-collocation step within a supergroup since anti-collocation is enforced by the supergroup concept.

In some embodiments, portions of a computer system organized according to blocks 701-705, can be maintained 706, wherein the maintenance function includes taking down, simultaneously, the independent component instances of the quiescence groups within a given supergroup.

In view of the foregoing, in the context of the method 700 of FIG. 7, supergroups can be created without knowledge of the hardware they will run on, which can be useful when deploying to heterogeneous clouds. It can be noted that the method 700 may not fully optimize hardware utilization because no two QSGs can have VMs that coexist on the same physical server.

Figure 8:
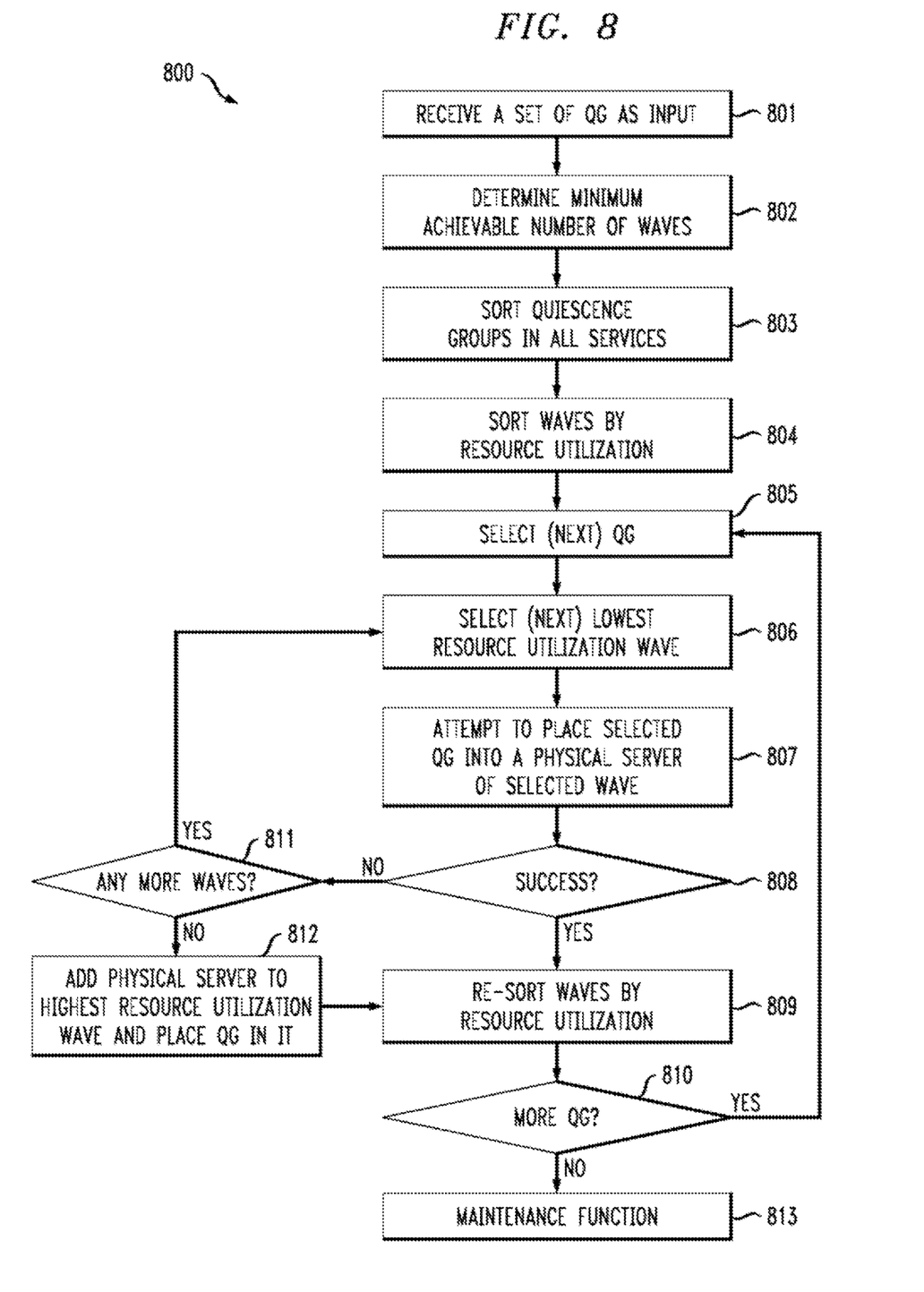
FIG. 8 is a diagram illustrating a method for upgrade wave scheduling according to an exemplary embodiment of the present invention.

Referring to FIG. 8, in a heuristically optimized placement method 800, a set of QGs for a given service are provided 801, which can be expressed as: QG(i,j), where i=service ID and j=QG ID within that service. The method further includes determining a minimum achievable number of waves 802. According to at least one embodiment of the present invention, upon initiation, all waves start with zero physical servers. In some embodiments the minimum achievable number of waves W is the largest number of QGs contained by any service, W=max |QG(i,j)| for all i,j. The method further comprises sorting all QGs in all services from heaviest to lightest 803. According to at least one embodiment, the concept of a QG's weight is related to resource commitment. Other notions of weight can be used. At block 804 all waves are sorted by resource utilization, from a wave with the lowest resource utilization to a wave with the highest resource utilization. It should be understood that in some embodiments, a wave's resource utilization is calculated as a sum of the wave's physical servers' resource consumption divided by a sum of the wave's physical servers' resource capacities. At blocks 805-812, for each QG(i,j), and for each wave w, the method includes attempting to place each QG(i,j) into a wave w with the lowest resource utilization subject to the constraint i!=m for all QG(m,*) in wave w, and within wave w place QG(i,j) on a physical server having a lowest resource utilization and within which QG(i,j) will fit (see block 807). According to one or more embodiments of the present invention, at block 805, the quiescence groups are sequentially selected (through the loop(s) of blocks 805-812) beginning with a quiescence group having a heaviest resource consumption among all the quiescence groups. It should be understood that in some embodiments the physical server resource utilization is calculated as the physical server resource consumption divided by the physical server resource capacity. The load balancing at blocks 805-812 includes placing each QG in a wave such that each wave includes not more than one QG from the same service. If QG(i,j) is fit in a currently selected wave w at 807-808, go to next QG at 810 and if QG(i, j) does not fit in any wave 811, a physical server is added to the wave win W having the highest resource utilization 812, for which i!=m for all QG(m,*) in wave w, and place QG(i,j) into that wave w. At block 809, the waves are re-sorted by resource utilization.

It should be understood that the method 800 of FIG. 8 improves hardware utilization. It can be noted that the method 800 ties the creation of the waves or supergroups to a given hardware capability.

In some embodiments, portions of a computer system organized according to blocks 801-810, can be maintained 813, wherein the maintenance function includes taking down, simultaneously, the independent component instances of the quiescence groups within a given supergroup.

In some embodiments, the overall principles of assigning resources to multiple availability zones is applicable to a number of other domains, such as scheduling maintenance on any complex physical or logical system. Stated another way, while this disclosure is couched in terms of highly available clusters composed of Quiescence Groups, it should be clear that the method for eliminating outages due to planned maintenance would apply to any isomorphic problem, including placement of resources across multiple sites for disaster recovery, and planned maintenance of the sites, and placement of storage on array of redundant disk drive groups that need to be proactively maintained based on failure prediction.

Recapitulation

According to an embodiment of the present invention, a method of organizing computer resources includes receiving a specification defining a plurality of quiescence groups of independent component instances for each of at least two services 701, and performing a first load balancing of the quiescence groups across a plurality of physical servers to define a plurality of supergroups 703 while assigning each of the physical servers across the supergroups 704. In some embodiments, each of the supergroups contains a set of the component instances from at least one of the services, and the assignment of the physical servers across the supergroups balances a load thereof 704, and the method further comprises performing a second load balancing of the component instances in each of the supergroups to the physical servers thereof 705.

According to some embodiments of the present invention, in a method of organizing resources of a computer system, the computer system being organized into a plurality of supergroups, each of the supergroups including at least one quiescence group of independent component instances executing on different physical servers, the method includes determining a minimum achievable number of supergroups needed to perform a service of the computer system 802, sorting the quiescence groups in a plurality of services by resource consumption 803, sorting the supergroups by resource utilization 804, and selecting each of the quiescence groups sequentially beginning with a quiescence group having a heaviest resource consumption 805, and placing a currently selected quiescence group on a supergroup having a lowest resource utilization among the supergroups and into which the currently selected quiescence group fits 807, and within the supergroup having the lowest resource utilization placing the currently selected quiescence group on a physical service having a lowest resource utilization among the physical servers 807, and resorting the supergroups by resource utilization upon placing the currently selected quiescence group 809. In some embodiments, placing the currently selected quiescence group on the supergroup having the lowest resource utilization among the supergroups and into which the currently selected quiescence group fits further includes determining that the currently selected quiescence group does not fit in any of the supergroups 808, adding a physical server to one of the supergroups having a highest resource utilization, and placing the selected group on the physical server added to the supergroup having the highest resource utilization 812.

According to some embodiments of the present invention, in a method of organizing resources of a computer system, the computer system being organized into a plurality of supergroups, each of the supergroups including at least one quiescence group of independent component instances executing on different physical servers, the method includes determining a minimum achievable number of supergroups needed to perform a service of the computer system 702, placing the quiescence groups into the supergroups 703, wherein at least one of the quiescence groups is placed in each of the supergroups and each of the quiescence groups comprises independent component instances of the service, assigning a plurality of physical servers to each of the supergroups 704; and load-balancing the independent component instances to the physical servers assigned to each of the supergroups 705, wherein the placement of the quiescence groups into the supergroups is performed without knowledge of the physical servers. In some embodiments, the methods further includes adding a new physical server to a first supergroup of the supergroups upon determining that a resource of the first supergroup's physical servers is insufficient for the quiescence groups of the first supergroup.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for organizing and servicing resources of the computer system. Further, a computer program product can include a tangible computer-readable recordable storage medium with code adapted to be executed to carry out one or more method steps described herein, including the provision of the system with the distinct software modules.

Figure 9:
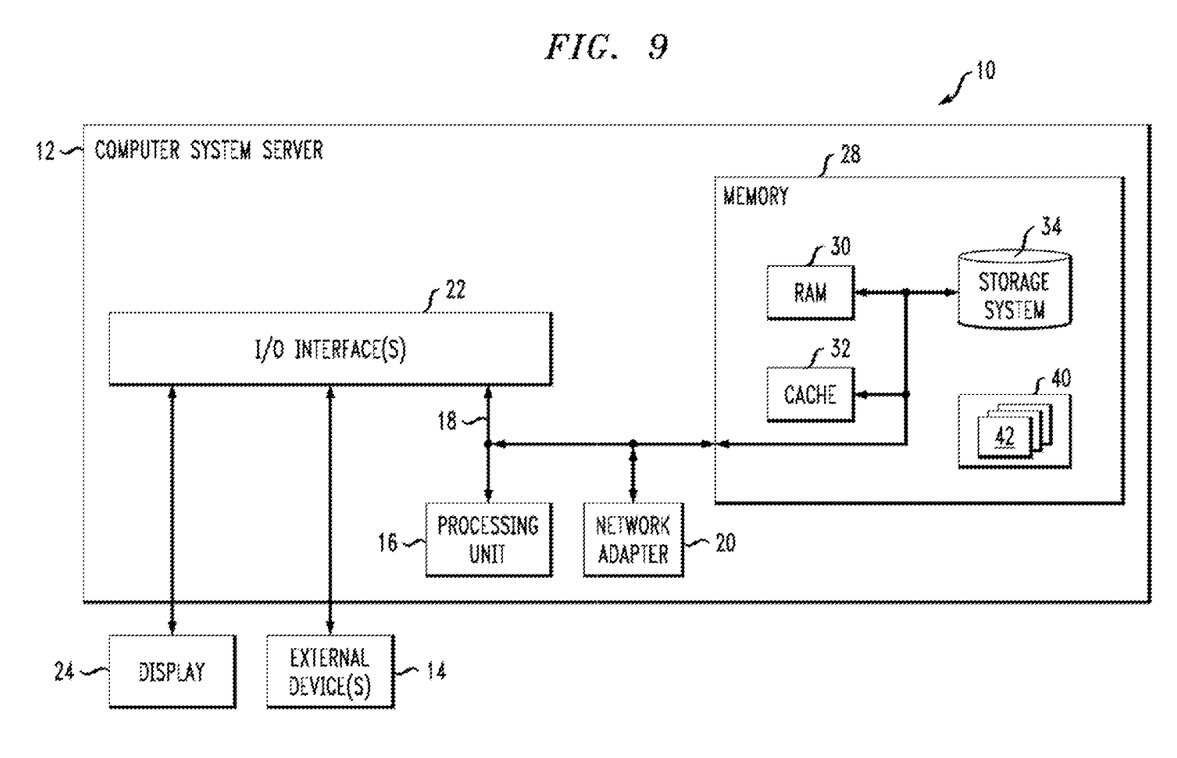
FIG. 9 is a block diagram depicting an exemplary computer system embodying a method according to an exemplary embodiment of the present invention.

One or more embodiments of the invention, or elements thereof, can be implemented in the form of an apparatus including a memory and at least one processor that is coupled to the memory and operative to perform exemplary method steps. FIG. 9 depicts a computer system that may be useful in implementing one or more aspects and/or elements of the invention, also representative of a cloud computing node according to an embodiment of the present invention. Referring now to FIG. 9, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of organizing resources of a computer system implementing a plurality of services, the method comprising:
    obtaining as input a set of quiescence groups, wherein the quiescence groups capture sets of component instances of the computer system that can be taken down at a same time;
    determining a minimum achievable number of supergroups, wherein the supergroups are configured such that none of the plurality of services are broken by having more than one of the quiescence groups on a downed physical server of the computer system in a given supergroup, and wherein the minimum achievable number of supergroups is determined as a largest number of the quiescence groups contained by any of the plurality of services;
    for each service of the plurality of services, sorting all the corresponding quiescence groups by an amount of resources of the computer system committed to each of the quiescence groups;
    sorting the supergroups by resource utilization, from a lowest to a highest resource utilization, wherein a resource utilization of each supergroup is calculated as a sum of that supergroup's physical servers' resource consumption divided by a sum of the that supergroup's physical servers' resource capacities; and
    selecting each of the quiescence groups sequentially beginning with a quiescence group having a heaviest resource consumption, and placing a currently selected quiescence group on a supergroup having a lowest resource utilization among the supergroups and into which the currently selected quiescence group fits, and within the supergroup having the lowest resource utilization placing the currently selected quiescence group on a physical service having a lowest resource utilization among the physical servers, and resorting the supergroups by resource utilization upon placing the currently selected quiescence group;
    wherein placing the currently selected quiescence group on the supergroup having the lowest resource utilization among the supergroups and into which the currently selected quiescence group fits further comprises:
    determining that the currently selected quiescence group does not fit in any of the supergroups;
    adding a physical server to one of the supergroups having a highest resource utilization; and
    placing the selected group on the physical server added to the supergroup having the highest resource utilization.

2. The method of claim 1, wherein the placement of the quiescence groups into the supergroups uses a minimum number of the physical servers.

3. The method of claim 1, wherein anti-collocation of dependent ones of the component instances to the physical servers is enforced by the placement of the quiescence groups into the supergroups.

4. The method of claim 1, further comprising assigning the physical servers such that no two supergroups have component instances coexisting on a same one of the physical servers.

5. The method of claim 1, further comprising performing a maintenance function on portions of the computer system supporting sequential ones of the supergroups without interrupting the services.

6. The method of claim 5, wherein performing the maintenance function includes taking down, simultaneously, the independent component instances of the quiescence groups within a given supergroup.

* * * * *